United States Patent
Ogawa et al.

(10) Patent No.: US 9,845,006 B2
(45) Date of Patent: Dec. 19, 2017

(54) CLUTCH CONTROL DEVICE FOR 4-WHEEL DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/117,856

(22) PCT Filed: Feb. 24, 2015

(86) PCT No.: PCT/JP2015/055249
§ 371 (c)(1),
(2) Date: Aug. 10, 2016

(87) PCT Pub. No.: WO2015/129694
PCT Pub. Date: Sep. 3, 2015

(65) Prior Publication Data
US 2016/0355086 A1    Dec. 8, 2016

(30) Foreign Application Priority Data
Feb. 27, 2014    (JP) .................................. 2014-036445

(51) Int. Cl.
F16H 61/00    (2006.01)
B60K 6/52    (2007.10)
(Continued)

(52) U.S. Cl.
CPC ............ *B60K 17/02* (2013.01); *B60K 17/344* (2013.01); *B60K 23/08* (2013.01); *F16D 11/00* (2013.01);
(Continued)

(58) Field of Classification Search
CPC .......................... F16H 2061/0474; B60K 6/52
See application file for complete search history.

(56) References Cited

U.S. PATENT DOCUMENTS 5,038,884 A * 8/1991 Hamada ................. B60K 17/35
                                                            180/233
2004/0211611 A1 10/2004 Ohno et al.
(Continued)

FOREIGN PATENT DOCUMENTS

| CN | 1486880 A | 4/2004 |
| CN | 102126430 A | 7/2011 |
| CN | 103287261 A | 9/2013 |
| EP | 2 634 033 A1 | 9/2013 |
| JP | 2002-293150 A | 10/2002 |
| JP | 2010-254058 A | 11/2010 |

(Continued)

*Primary Examiner* — Tisha Lewis
(74) *Attorney, Agent, or Firm* — Global IP Counselors, LLP

(57) ABSTRACT

A clutch control device is provided for a four-wheel drive vehicle for transmitting drive force to the rear wheels. The clutch control device includes a dog clutch and a friction clutch, and a controller that controls the engagement and disengagement of the dog clutch and the friction clutch. In this clutch control device, when there is a request to engage the dog clutch from a disengaged state, the controller, during the engagement control of the friction clutch, first controls the engagement of the friction clutch, monitors the change gradient of the clutch rotational speed difference of the dog clutch and starts engagement of the dog clutch upon determining that the gradient of the clutch rotational speed difference is no longer decreasing.

12 Claims, 7 Drawing Sheets

(51) Int. Cl.

| | | |
|---|---|---|
| *B60K 17/02* | (2006.01) | |
| *B60K 17/344* | (2006.01) | |
| *B60K 23/08* | (2006.01) | |
| *F16D 11/00* | (2006.01) | |
| *F16D 13/00* | (2006.01) | |
| *F16D 21/00* | (2006.01) | |
| *F16D 48/06* | (2006.01) | |

(52) U.S. Cl.
CPC ............. *F16D 13/00* (2013.01); *F16D 21/00* (2013.01); *F16D 48/06* (2013.01); *B60K 2023/0825* (2013.01); *B60K 2023/0833* (2013.01); *F16D 2500/1045* (2013.01); *F16D 2500/10431* (2013.01); *F16D 2500/10462* (2013.01); *F16D 2500/308* (2013.01); *F16D 2500/30417* (2013.01)

(56) References Cited

U.S. PATENT DOCUMENTS

| | | |
|---|---|---|
| 2009/0277711 A1 | 11/2009 | Hoffmann et al. |
| 2011/0082004 A1 | 4/2011 | Kato et al. |
| 2011/0218715 A1 | 9/2011 | Duraiswamy et al. |
| 2013/0220722 A1* | 8/2013 | Mita ...................... B60K 17/34 180/249 |
| 2014/0058638 A1* | 2/2014 | Taniguchi ............. B60W 10/06 701/69 |
| 2016/0229405 A1* | 8/2016 | Shimizu .............. B60W 30/182 |
| 2016/0258530 A1* | 9/2016 | Maurer ................ F16H 61/0403 |

FOREIGN PATENT DOCUMENTS

| | | |
|---|---|---|
| JP | 2011-79421 A | 4/2011 |
| JP | 2011-255846 A | 12/2011 |
| JP | 2012-245813 A | 12/2012 |

* cited by examiner

CLUTCH CONTROL DEVICE FOR 4-WHEEL DRIVE VEHICLE

CROSS-REFERENCE TO RELATED APPLICATIONS

This application is a U.S. National stage application of International Application No. PCT/JP2015/055249, filed Feb. 24, 2015, which claims priority to JP Patent Application No. 2014-036445 filed on Feb. 27, 2014, the contents of which are hereby incorporated herein by reference.

BACKGROUND

Field of the Invention

The present invention generally relates to a clutch control device for a four-wheel drive vehicle in which a system for transmitting drive force to auxiliary drive wheels is provided with a dog clutch and a friction clutch.

Background Information

Conventionally, a front wheel drive based four-wheel drive vehicle in which a system for transmitting drive force to the rear wheels is provided with a dog clutch and a friction clutch is known (refer to, for example, Japanese Laid-Open Patent Application No. 2010-254058). In the four-wheel drive vehicle, when switching from a two-wheel drive mode to a four-wheel drive mode, the dog clutch is engaged after the friction clutch is engaged. In addition, when switching from the four-wheel drive mode to the two-wheel drive mode, the dog clutch is released after the friction clutch is released.

SUMMARY

However, in a conventional device, when switching from a two-wheel drive mode to a four-wheel drive mode, if the friction clutch is engaged and the differential rotation is eliminated in a mesh waiting state in which there is differential rotation in the dog clutch, the dog clutch is pressed/engaged. Consequently, there is the problem that when the main drive wheels are in a slip state, the amount that the differential rotation can be reduced is limited depending on the vehicle state, leading to cases in which the dog clutch cannot be engaged. In addition, there is the problem that, when the main drive wheels are in a slip state and the dog clutch is attempted to be forcibly engaged in a state in which there is a clutch differential rotation, it is difficult to determine an appropriate differential rotation that allows satisfactory sound vibration performance.

In view of the problems described above, an object of the present invention is to provide a clutch control device for a four-wheel drive vehicle capable of engaging the dog clutch while satisfying sound vibration performance, regardless of whether the main drive wheels are in a non-slip state or a slip state, when there is a request to engage the dog clutch.

In order to achieve the object above, in the present invention, of the left and right front wheels and the left and right rear wheels, one pair is set as the main drive wheels which are connected to a drive source and the other pair is set as the auxiliary drive wheels which are connected to the drive source via a clutch. Provided as the clutches are a dog clutch and a friction clutch, disposed in a transmission system path on the drive branch-side across the differential and in a transmission system path on the auxiliary drive wheel-side, respectively, of a system for transmitting drive force to the auxiliary drive wheels. The dog clutch separates the system for transmitting drive force to the auxiliary drive wheels from the system for transmitting drive force to the main drive wheels by releasing the clutch, and the friction clutch allocates a portion of the drive force from the drive source to the auxiliary drive wheels in accordance with the clutch engagement capacity. In this four-wheel drive vehicle, a clutch control means is provided, which carries out an engagement and disengagement control of the dog clutch and an engagement and disengagement control of the friction clutch. When there is a request to engage the dog clutch, which is in a disengaged state, the clutch control means first controls the engagement of the friction clutch, monitors the change gradient of the clutch differential rotation speed of the dog clutch while controlling the engagement of the friction clutch, and starts the engagement of the dog clutch when it is determined that the gradient of the clutch differential rotation speed is no longer decreasing.

Therefore, when there is a request to engage the dog clutch, which is in a disengaged state, the engagement of the friction clutch is controlled first. The change gradient of the clutch differential rotation speed of the dog clutch is monitored while the engagement of this friction clutch is controlled, and the engagement of the dog clutch is started when it is determined that the gradient of the clutch differential rotation speed is no longer decreasing. That is, when the engagement of the friction clutch is controlled, the clutch differential rotation speed of the dog clutch decreases with time, and the clutch differential rotation speed is reduced to zero when the main drive wheels are in a non-slip state. However, when the main drive wheels are in a slip state, the clutch differential rotation speed is reduced, after which the clutch differential rotation speed increases with time. On the other hand, when the dog clutch is engaged, the sound vibration performance is improved as the clutch differential rotation speed decreases (the lower the clutch differential rotation speed). In contrast, with a focus on the change gradient of the clutch differential rotation speed, the engagement of the dog clutch is started when it is determined that the gradient is no longer decreasing. Accordingly, an appropriate engagement timing that allows satisfactory sound vibration performance is determined, such as, when the clutch differential rotation speed is zero when the main drive wheels are in a non-slip state, and when the clutch differential rotation speed is minimal when the main drive wheels are in a slip state. As a result, when there is request to engage the dog clutch, the dog clutch can be engaged while allowing satisfactory sound vibration performance, regardless of whether the main drive wheels are in a non-slip state or a slip state.

DETAILED DESCRIPTION OF THE EMBODIMENTS

Figure 1:
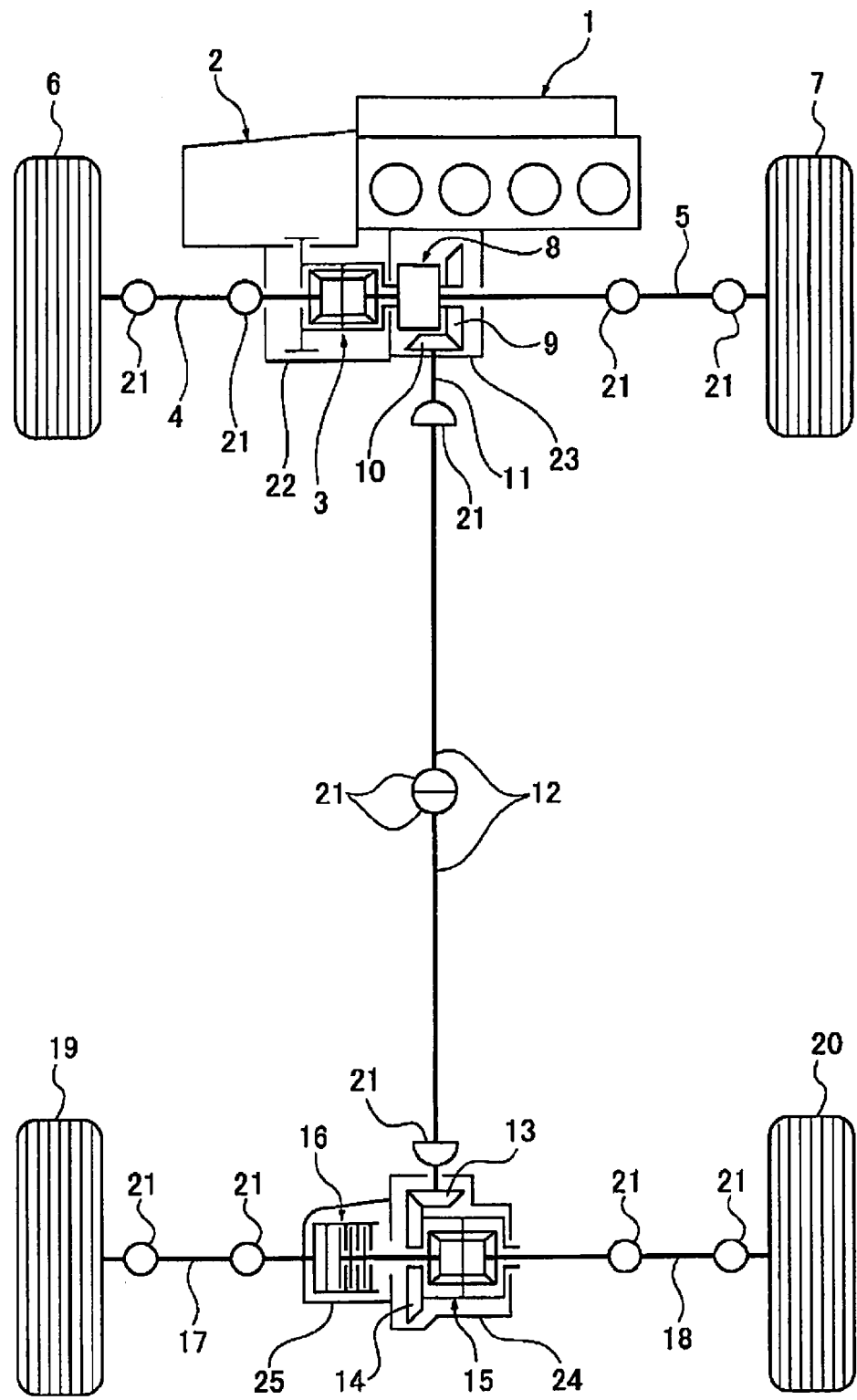
FIG. 1 is a block view of the drive system illustrating the configuration of the drive system of a front wheel drive based four-wheel drive vehicle to which is applied the clutch control device of the first embodiment.

Preferred embodiments for realizing the clutch control device for a four-wheel drive vehicle of the present invention will be described below based on the first embodiment and the second embodiment illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment. The overall configuration of the clutch control device for a drive system configuration of four-wheel drive vehicle will be described first.

Drive System Configuration of the Four-Wheel Drive Vehicle

FIG. 1 illustrates the configuration of the drive system of a front wheel drive based four-wheel drive vehicle to which is applied the clutch control device. The drive system configuration of the four-wheel drive vehicle will be described below based on FIG. 1.

The front wheel drive system of the four-wheel drive vehicle is provided with a transverse engine 1 (drive source), a transmission 2, a front differential 3, a left front wheel drive shaft 4, a right front wheel drive shaft 5, a left front wheel 6 (main drive wheel), and a right front wheel 7 (main drive wheel), as illustrated in FIG. 1. That is, the drive force is transmitted from the transverse engine 1 and the transmission 2 to the left and right front wheel drive shafts 4, 5 via the front differential 3, and constantly drives the left and right front wheels 6 and 7 while allowing a differential rotation.

The rear wheel drive system of the four-wheel drive vehicle comprises a dog clutch 8 (dog clutch), a bevel gear 9, an output pinion 10, a rear wheel output shaft 11, and a propeller shaft 12, as illustrated in FIG. 1. Further provided are a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). In FIG. 1, a universal joint 21 is provided. That is, the drive system is configured to be capable of selecting a two-wheel drive mode (i.e., disconnected, two-wheel drive mode) in which both the dog clutch 8 and the electronically controlled coupling 16 are disengaged. The rotation of the drive system (rotation of the propeller shaft 12, etc.) on the downstream side of the dog clutch 8 is stopped by releasing this dog clutch 8 and electronically controlled coupling 16. The suppression of friction loss and oil stirring loss to achieve improved fuel efficiency is thereby possible.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The input side meshing member of the dog clutch 8 is connected to the differential case of the front differential 3, and the output side meshing member of the dog clutch 8 is connected to the bevel gear 9. The dog clutch 8, the bevel gear 9, the output pinion 10, and a portion of the rear wheel output shaft 11 are incorporated in a transfer case 23 that is fixed to a position adjacent to the front differential housing 22. For example, a dog clutch in which one of a pair of meshing members is a fixing member and the other is a movable member, in which a spring that biases in the engaging direction is provided between the fixing member and the movable member, and in which a screw groove that can be fitted with a solenoid pin is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the dog clutch 8 is engaged and the fitting of the solenoid pin with respect to the screw groove is disengaged, the movable member makes a stroke in the engaging direction toward the fixing member due to the biasing force of the spring, and the teeth of the two are meshed and engaged.

The electronically controlled coupling 16 is a friction clutch that is provided in a downstream position of the dog clutch 8, and that allocates a portion of the drive force from the transverse engine 1 to the left and right rear wheels 19 and 20, in accordance with the clutch engagement capacity. An input side clutch plate of the electronically controlled coupling 16 is connected to a left side gear of the rear differential 15, and an output side clutch plate is connected to a left rear wheel drive shaft 17. This electronically controlled coupling 16 is incorporated in a coupling case 25 that is fixed in a position adjacent to a rear differential case 24. For example, an electronically controlled coupling comprising a multi-plate friction clutch in which multiple input-side and output-side plates are alternately arranged, a fixed cam piston and a movable cam piston which have opposing cam surfaces, and a cam member that is interposed between the opposing cam surfaces, is used as this electronically controlled coupling 16. The engagement of the electronically controlled coupling 16 is carried out by the movable cam piston being moved in the clutch engaging direction in accordance with the rotation angle to increase the frictional engagement force of the multi-plate friction clutch, due to a cam action that expands the piston gap that is generated by an electric motor rotating the movable cam piston. The release of the electronically controlled coupling 16 is carried out by the movable cam piston being moved in the clutch releasing direction in accordance with the rotation angle to decrease the frictional engagement force of the multi-plate friction clutch, due to a cam action that reduces the piston gap that is generated by the electric motor rotating the movable cam piston in the opposite direction of the engaging direction.

Control System Configuration of the Four-Wheel Drive Vehicle

Figure 2:
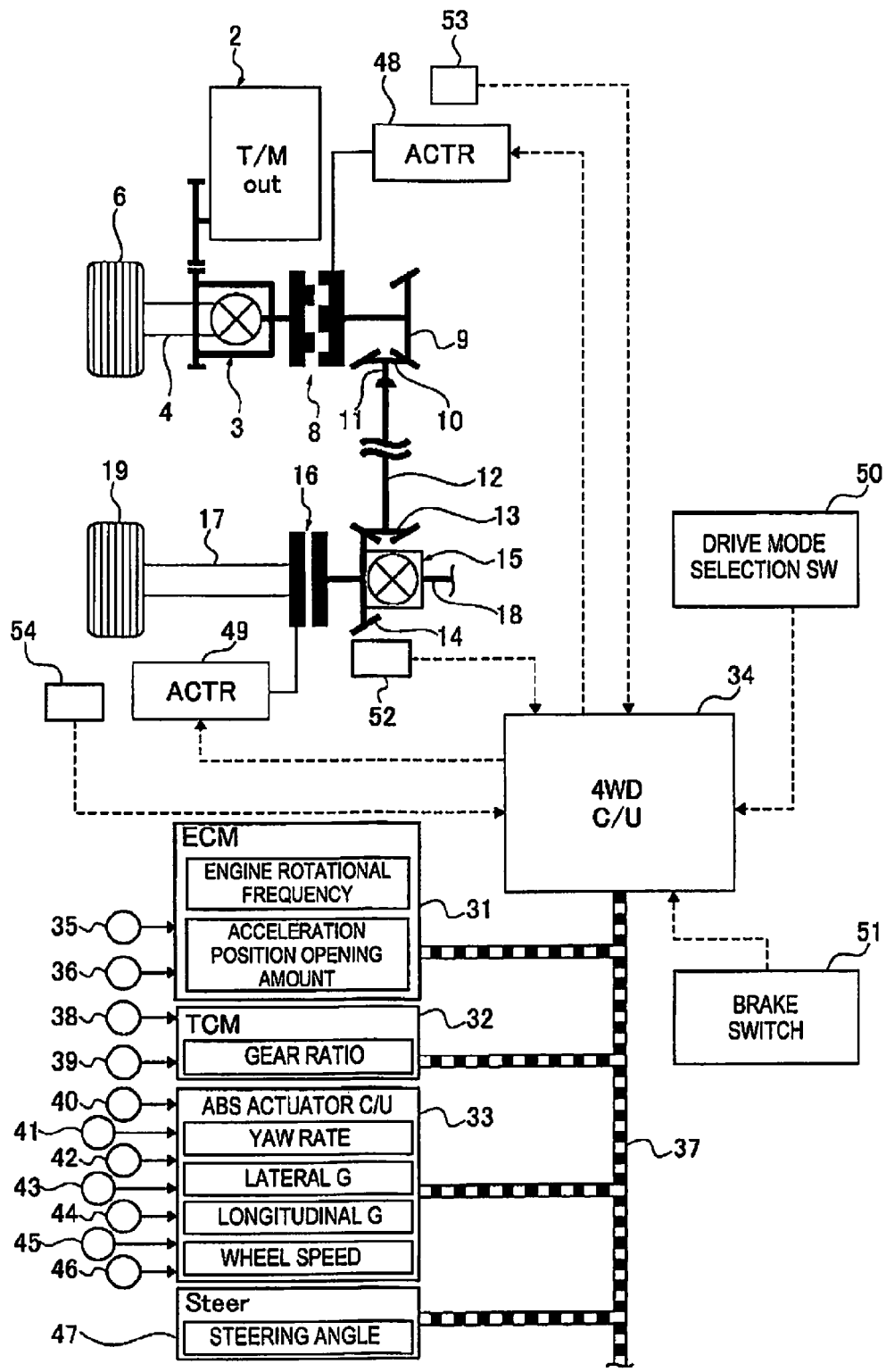
FIG. 2 is a block view of the control system illustrating the configuration of the control system of the front wheel drive based four-wheel drive vehicle to which is applied the clutch control device of the first embodiment.

FIG. 2 illustrates the configuration of the control system of the front wheel drive based four-wheel drive vehicle to which is applied the clutch control device. The control system configuration of the four-wheel drive vehicle will be described below based on FIG. 2.

The control system of the four-wheel drive vehicle is provided with an engine control module 31, a transmission control module 32, an ABS actuator control unit 33, and a 4WD control unit 34, as illustrated in FIG. 2.

The engine control module 31 is a control device of the transverse engine 1, which inputs detection signals from an engine rotational frequency sensor 35, an accelerator position opening amount sensor 36, and the like. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like. Gear ratio information (gear ratio information) is input from this transmission control module 32 to the 4WD control unit 34 via the CAN communication line 37.

The ABS actuator control unit 33 is a control device of an ABS actuator which controls the brake fluid pressure on each wheel, which inputs detection signals from a yaw rate sensor 40, a lateral G sensor 41, a longitudinal G sensor 42, and wheel speed sensors 43, 44, 45, 46, and the like. Yaw rate information, lateral G information, longitudinal G information, and wheel speed information of each wheel, are input from this ABS actuator control unit 33 to the 4WD control unit 34 via the CAN communication line 37. Besides the information described above, steering angle information from a steering angle sensor 47 is input to the 4WD control unit 34 via the CAN communication line 37. The average value of the left and right rear wheel speed information will be the vehicle speed information (VSP information).

The 4WD control unit 34 is a control device that controls the engagement and disengagement of the dog clutch 8 and the electronically controlled coupling 16, and carries out a calculation step based on various input information. The control unit outputs drive control commands to a dog clutch actuator 48 (solenoid) and an electronically controlled coupling actuator 49 (electric motor). Here, a drive mode selection switch 50, a brake switch 51 that detects the presence/absence of a braking operation, a ring gear rotational frequency sensor 52, a dog clutch stroke sensor 53, a motor rotation angle sensor 54, and the like are provided as input information sources from other than the CAN communication line 37.

The drive mode selection switch 50 is a switch with which a driver switches to select among a "2WD mode," a "lock mode," and an "auto mode." When the "2WD mode" is selected, a front wheel drive 2WD state in which the dog clutch 8 and the electronically controlled coupling 16 are released is maintained. When the "lock mode" is selected, a full 4WD state in which the dog clutch 8 and the electronically controlled coupling 16 are engaged is maintained. Furthermore, when the "auto mode" is selected, the engagement and disengagement of the dog clutch 8 and the electronically controlled coupling 16 are automatically controlled in accordance with the vehicle state (vehicle speed VSP, accelerator position opening amount ACC). Here, in "auto mode," there is a choice between an "eco-auto mode" and a "sports auto mode," where the release state of the electronically controlled coupling 16 in "standby two-wheel drive mode," in which the dog clutch 8 is engaged, will differ and depends upon the selected mode. That is, when "eco-auto mode" is selected, the electronically controlled coupling 16 is placed in a fully released state and waits, and when "sports auto mode" is selected, the electronically controlled coupling 16 is placed in a released state immediately before engagement and waits.

The ring gear rotational frequency sensor 52 is a sensor for acquiring output rotational speed information of the dog clutch 8, and which calculates the output side rotational frequency of the dog clutch 8 by taking into consideration the rear side gear ratio and the front side gear ratio upon calculation with respect to the detected value of the ring gear rotational frequency. The input rotational speed information of the dog clutch 8 is obtained by calculating the average value of the left front wheel speed from the left front wheel speed sensor 43 and the right front wheel speed from the right front wheel speed sensor 44.

Drive Mode Switching Configuration

Figure 3:
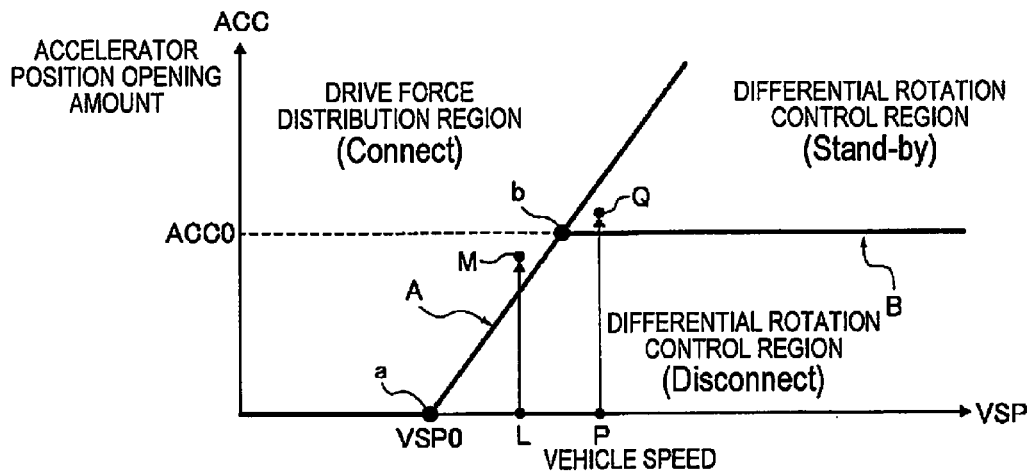
FIG. 3 is a basic map view illustrating a drive mode switching map corresponding to the vehicle speed and the accelerator position opening amount used in the clutch control, when the "auto mode" of the first embodiment is selected.
Figure 4:
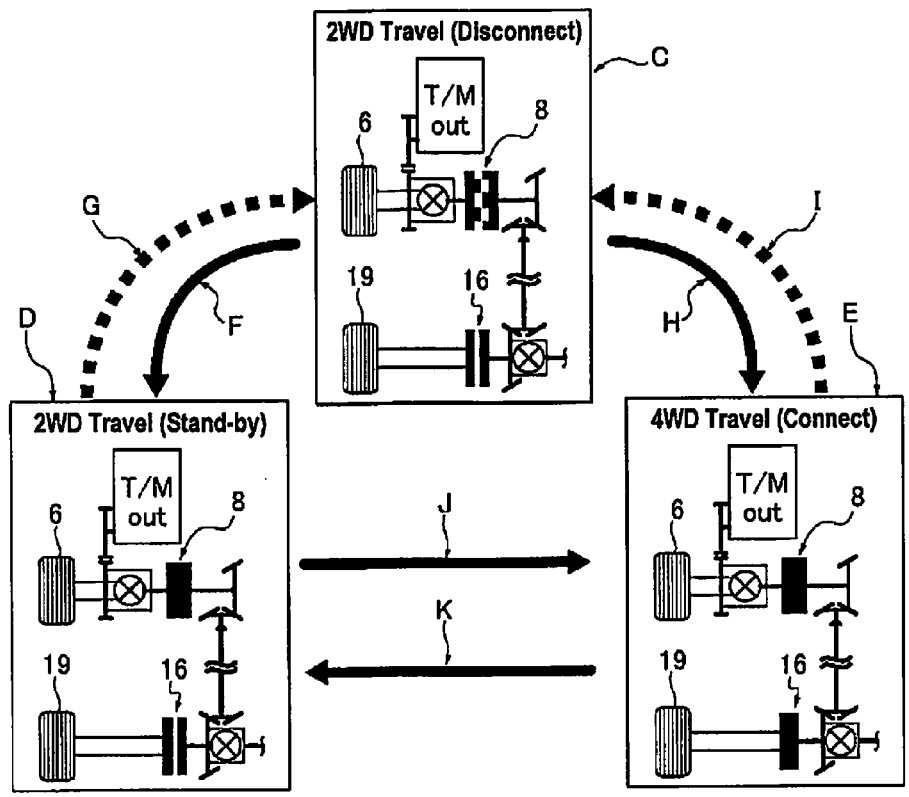
FIG. 4 is a drive mode transition view illustrating the switching transition of the drive mode (disconnected, two-wheel drive mode/standby two-wheel drive mode/connected, four-wheel drive mode) by the clutch control, when the "auto mode" of the first embodiment is selected.

FIG. 3 illustrates a drive mode switching map corresponding to the vehicle speed VSP and the accelerator position opening amount ACC used in the clutch control when the "auto mode" is selected, and FIG. 4 illustrates the switching transition of the drive mode (disconnected, two-wheel drive mode/standby two-wheel drive mode/connected, four-wheel drive mode). The drive mode switching configuration will be described below, based on FIGS. 3 and 4.

The drive mode switching map is set to be separated into the disconnected, two-wheel drive mode (Disconnect), the standby two-wheel drive mode (Standby), and the connected, four-wheel drive mode (Connect), in accordance with the vehicle speed VSP and the accelerator position opening amount ACC, as illustrated in FIG. 3. These three drive modes are separated by a region dividing line A in which the accelerator position opening amount ACC is increased proportionally with the increase in the vehicle speed VSP from a base point a of a set vehicle speed VSP0 at which the accelerator position opening amount is zero, and a region dividing line B of a constant accelerator position opening amount ACC0, which is drawn from an intersection b with the region dividing line A toward the high vehicle speed side.

The disconnected, two-wheel drive mode (Disconnect) is set in the region in which the accelerator position opening amount ACC is less than or equal to the set accelerator position opening amount ACC0, and which is surrounded by the vehicle speed axis line on which the accelerator position opening amount ACC is zero, the region dividing line A, and the region dividing line B. That is, the mode is set in a region in which the frequency of occurrence of differential rotation of the left and right front wheels 6 and 7 and the left and right rear wheels 19 and 20 due to wheel slip is extremely low, since the accelerator position opening amount ACC is less than or equal to the set accelerator position opening amount ACC0; and even if wheel slip does occur, the four-wheel drive requirement is low, so that slip increases slowly.

The standby two-wheel drive mode (Standby) is set in a high vehicle speed region in which the accelerator position opening amount ACC exceeds the set accelerator position opening amount ACC0, and which is defined by the region dividing line A and the region dividing line B. That is, the mode is set in a region in which, since the accelerator position opening amount ACC exceeds the set accelerator position opening amount ACC0, while the 4WD requirement is low because the vehicle speed VSP is in a high vehicle speed region, if differential rotation of the left and right front wheels 6 and 7 and the left and right rear wheels 19 and 20 is generated due to wheel slip, there is a high probability that slip will increase rapidly.

The connected, four-wheel drive mode (Connect) is set in the region surrounded by the accelerator position opening amount axis line on which the vehicle speed VSP is zero, the vehicle speed axis line on which the accelerator position opening amount ACC is zero, and the region dividing line A. That is, the mode is set in a region in which the 4WD requirement is high, such as when starting or during high-load travel in which the vehicle speed VSP is low but the accelerator position opening amount ACC is high.

When the disconnected, two-wheel drive mode (Disconnect) is selected, the travel mode becomes 2WD travel (Disconnect) in which both the dog clutch 8 and the electronically controlled coupling 16 are released, as illustrated in frame C of FIG. 4. Basically, in this disconnected, two-wheel drive mode, front wheel drive 2WD travel (Disconnect), in which drive force is transmitted only to the left and right front wheels 6 and 7, is maintained. However, if the left and right front wheels 6 and 7 slip during front wheel drive 2WD travel and the wheel slip amount (i.e., amount of differential rotation between the front and rear wheels) exceeds a threshold value, the electronically controlled coupling 16 is frictionally engaged. Thereafter, if a rotationally synchronized state is determined, differential rotation control of the front and rear wheels to suppress wheel slip is carried out by engaging the dog clutch 8 and allocating drive force to the left and right rear wheels 19 and 20.

When the standby two-wheel drive mode (Standby) is selected, the travel mode becomes 2WD travel (Standby), in which the dog clutch 8 is engaged and the electronically controlled coupling 16 is released, as illustrated in frame D of FIG. 4. Basically, in this standby two-wheel drive mode, front wheel drive 2WD travel (Standby), in which drive force is transmitted only to the left and right front wheels 6 and 7, is maintained. However, if the left and right front wheels 6 and 7 slip during front wheel drive 2WD travel and the wheel slip amount (i.e., amount of differential rotation between the front and rear wheels) exceeds a threshold value, only the electronically controlled coupling 16 is frictionally engaged, since the dog clutch 8 has already been engaged. Differential rotation control of the front and rear wheels to suppress wheel slip is carried out by allocating drive force to the left and right rear wheels 19 and 20 with good responsiveness by this frictional engagement of the electronically controlled coupling 16.

When the connected, four-wheel drive mode (Connect) is selected, the travel mode becomes 4WD travel (Connect) in which both the dog clutch 8 and the electronically controlled coupling 16 are engaged, as illustrated in frame E of FIG. 4. Basically, in this connected, four-wheel drive mode (Connect), a drive force distribution control is carried out, which achieves the optimum drive force distribution to the left and right front wheels 6 and 7 and to the left and right rear wheels 19 and 20 that is suited to the road conditions (for example, control at the time of start, control corresponding to the accelerator position opening amount, and control corresponding to the vehicle speed). However, if a turning state of the vehicle is determined during 4WD travel from information from the steering angle sensor 47, the yaw rate sensor 40, the lateral G sensor 41, or the longitudinal G sensor 42, a control is carried out in which the engagement capacity of the electronically controlled coupling 16 is decreased to reduce the possibility of a tight corner braking phenomenon.

The switching transition between the 2WD travel (Disconnect), 2WD travel (Standby), and 4WD travel (Connect) is carried out by a switching request of the drive mode that is output when an operating point, which is determined by the vehicle speed VSP and the accelerator position opening amount ACC, crosses the region dividing line A and the region dividing line B illustrated in FIG. 3. The switching transition speed of each drive mode is determined so that the transition speed to a drive mode that meets a 4WD request is prioritized over the transition speed to the disconnected, two-wheel drive mode that meets a fuel efficiency request. That is, the switching transition speed of 2WD travel (Disconnect)→2WD travel (Standby) (arrow F in FIG. 4) is configured to be fast, and the switching transition speed of 2WD travel (Standby)→2WD travel (Disconnect) (arrow G in FIG. 4) is configured to be slow. Similarly, the switching transition speed of 2WD travel (Disconnect)→4WD travel (Connect) (arrow H in FIG. 4) is configured to be fast and the switching transition speed of 4WD travel (Connect)→2WD travel (Disconnect) (arrow I in FIG. 4) is configured to be slow. In contrast, the switching transition speed of 2WD travel (Standby)→4WD travel (Connect) (arrow J in FIG. 4) is configured to be the same fast speed as the switching transition speed of 4WD travel (Connect)→2WD travel (Standby) (arrow K in FIG. 4).

Clutch Control Configuration

Figure 5:
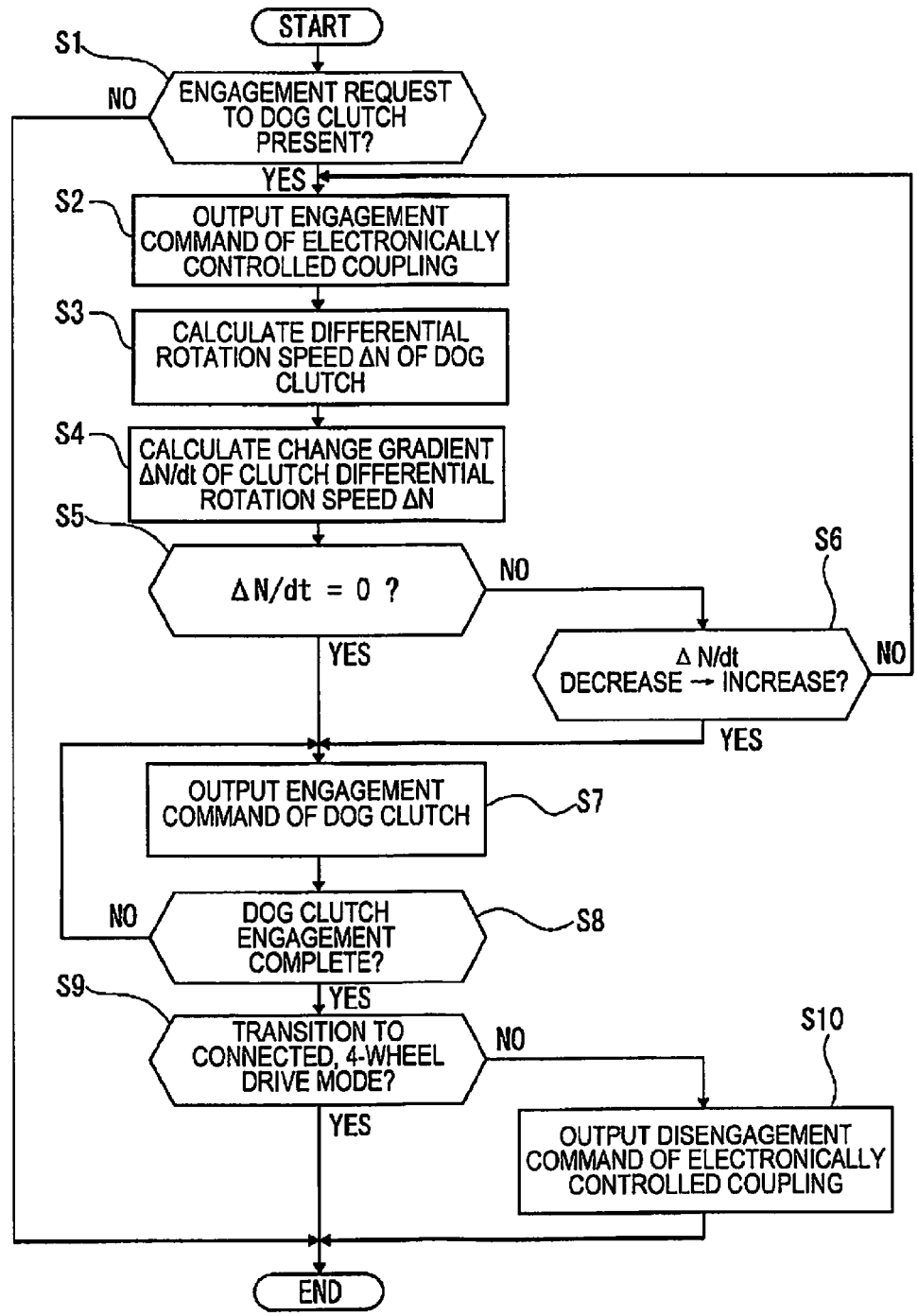
FIG. 5 is a flowchart illustrating the flow of the oil temperature control process that is executed in the 4WD control unit of the first embodiment.

FIG. 5 illustrates the flow of the clutch control process that is executed in the 4WD control unit 34 (clutch controller). Each of the steps in FIG. 5, which represents the clutch control configuration process will be described below. This flowchart is started when the "auto mode" is selected as well as the "disconnected, two-wheel drive mode," in which both the dog clutch 8 and the electronically controlled coupling 16 are disengaged, is selected as the drive mode.

In Step S1, whether or not there is a request to engage the dog clutch 8 is determined. If YES (engagement request present), the process proceeds to Step S2, and if NO (engagement request absent), the process proceeds to END. Here, a request to engage the dog clutch 8 is output when the "disconnected, two-wheel drive mode" is selected and it is determined that there is a mode transition to the "connected, four-wheel drive mode" or the "standby two-wheel drive mode."

In Step S2, following the determination that an engagement request is present in Step S1, or, the determination that the change gradient ΔN/dt of the clutch differential rotation speed ΔN is not decrease→increase in Step S6, an engagement command is output to the coupling actuator 49 of the electronically controlled coupling 16, and the process proceeds to Step S3. Here, the engagement command to the coupling actuator 49 will be a high-gradient command with which the electronically controlled coupling 16 is placed in a fully engaged state in a short period of time.

In Step S3, following the output of the engagement command of the electronically controlled coupling 16 in Step S2, the clutch differential rotation speed ΔN, which is the differential rotation of the dog clutch 8, is calculated, and the process proceeds to Step S4. Here, the clutch differential rotation speed ΔN is calculated by subtracting the output rotational speed (calculated value based on the detection value of the ring gear rotational frequency) from the input rotational speed (average value of the left and right front wheel speeds) of the dog clutch 8.

In Step S4, following the calculation of the clutch differential rotation speed ΔN in Step S3, the change gradient ΔN/dt of the clutch differential rotation speed ΔN is calculated by time-differentiating the clutch differential rotation speed ΔN, and the process proceeds to Step S5.

In Step S5, following the calculation of the change gradient ΔN/dt in Step S4, it is determined whether or not the change gradient ΔN/dt is ΔN/dt=0. If YES (ΔN/dt=0), the process proceeds to Step S7, and if NO (ΔN/dt≠0), the process proceeds to Step S6.

In Step S6, following the determination that ΔN/dt≠0 in Step S5, it is determined whether or not the change gradient ΔN/dt has shifted from decrease→increase. If YES (ΔN/dt is decrease→increase), the process proceeds to Step S7, and if NO (ΔN/dt is not decrease→increase), the process returns to Step S2.

In Step S7, following the determination that ΔN/dt=0 in Step S5, or, the determination that ΔN/dt is decrease→increase in Step S6, or, the determination that clutch engagement is incomplete in Step S8, an engagement command is output to the clutch actuator 48 of the dog clutch 8, and the process proceeds to Step S8.

In Step S8, following the output of an engagement command to the dog clutch 8 in Step S7, it is determined whether or not the engagement of the dog clutch 8 is complete. If YES (clutch engagement complete), the process proceeds to Step S9, and if NO (clutch engagement incomplete), the process returns to Step S7. Here, the determination of whether or not the engagement of the dog clutch 8 is complete is carried out on the basis of stroke information from the dog clutch stroke sensor 53.

In Step S9, following the determination that clutch engagement is complete in Step S8, it is determined whether or not it is a transition to the connected, four-wheel drive mode. If YES (transition to the connected, four-wheel drive mode), the process proceeds to END, and if NO (transition to standby two-wheel drive mode), the process proceeds to Step S10.

In Step S10, following the determination that it is a transition to the standby two-wheel drive mode in Step S9, a disengagement command is output to the coupling actuator 49 of the electronically controlled coupling 16, and the process proceeds to END. Here, of the "auto modes," if the "eco-auto mode" is selected, the command will be a command to fully disengage the electronically controlled coupling 16, and if the "sports auto mode" is selected, the command will be a command to maintain the released state immediately before engagement of the electronically controlled coupling 16.

Next, the actions are described. The "engagement control action of the dog clutch," the "synchronization determination action of the dog clutch," and the "other featured actions in the dog clutch engagement control" will be separately described, regarding the actions in the clutch control device for a four-wheel drive vehicle of the first embodiment.

Engagement Control Action of the Dog Clutch

First, the flow of the engagement control process of the dog clutch 8 will be described, with reference to the flowchart of FIG. 5. For example, during coasting travel in which the "disconnected, two-wheel drive mode" is selected and the operating point is moved from point L to point M in FIG. 3 by carrying out an accelerator depression operation, an engagement request is output to the dog clutch 8 at a timing when the operating point crosses the region dividing line A. Alternatively, when the operating point is moved from point P to point Q in FIG. 3, an engagement request is output to the dog clutch 8 at a timing when the operating point crosses the region dividing line B.

When an engagement request is output to the dog clutch 8, the process proceeds to Step S1→Step S2→Step S3→Step S4 in the flowchart of FIG. 5. In Step S2, if there is a request to engage the dog clutch 8, an engagement command is immediately outputted to the coupling actuator 49 of the electronically controlled coupling 16. Then, in Step S3, the clutch differential rotation speed ΔN, which is the differential rotation of the dog clutch 8, is calculated, and in Step S4, the change gradient ΔN/dt of the clutch differential rotation speed ΔN is calculated by time-differentiating the clutch differential rotation speed ΔN.

However, since the output side rotation of the dog clutch 8 is stopped before the engagement of the electronically controlled coupling 16 is started, the clutch differential rotation speed ΔN is at a maximum, and the clutch differential rotation speed ΔN is reduced as the output side rotation of the dog clutch 8 is increased in the engagement start region of the electronically controlled coupling 16. Accordingly, for a little while from the start of the engagement of the electronically controlled coupling 16, the change gradient zero condition in Step S5, or, the decrease→increase shift condition of the change gradient in Step S6, will not be satisfied. Therefore, until the condition of Step S5 or Step S6 is satisfied, a flow that proceeds to Step S2→Step S3→Step S4→Step S5→Step S6 will be repeated in the flowchart of FIG. 5.

Then, when the change gradient zero condition is satisfied in Step S5, the process proceeds to Step S5→Step S7→Step S8 in the flowchart of FIG. 5, and in Step S7, an engagement command is output to the clutch actuator 48 of the dog clutch 8. In the next Step S8, it is determined whether or not the engagement of the dog clutch 8 is complete, and while it is determined that the clutch engagement is incomplete, the flow that proceeds to Step S7→Step S8 is repeated.

In addition, when the decrease→increase shift condition of the change gradient is satisfied in Step S6, the process proceeds to Step S5→Step S6→Step S7→Step S8 in the flowchart of FIG. 5, and in Step S7, an engagement command is output to the clutch actuator 48 of the dog clutch 8. In the next Step S8, it is determined whether or not the engagement of the dog clutch 8 is complete, and while it is determined that the clutch engagement is incomplete, the flow that proceeds to Step S7→Step S8 is repeated.

Then, if it is determined that the engagement of the dog clutch 8 is completed in Step S8, the process proceeds from Step S8 to Step S9, and in Step S9, it is determined whether or not it is a transition to the "connected, four-wheel drive mode." If it is determined that it is a transition to the "connected, four-wheel drive mode," the process proceeds to END while maintaining the engagement of the electronically controlled coupling 16. On the other hand, if it is determined that it is a transition to the "standby two-wheel drive mode," the process proceeds to Step S10, and in Step S10, a disengagement command is output to the coupling actuator 49 of the electronically controlled coupling 16, and the process proceeds to END. If the "eco-auto mode" is selected, the command will be a command to fully disengage the electronically controlled coupling 16, and if the "sports auto mode" is selected, the command will be a command to maintain the released state immediately before engagement of the electronically controlled coupling 16.

Figure 6:
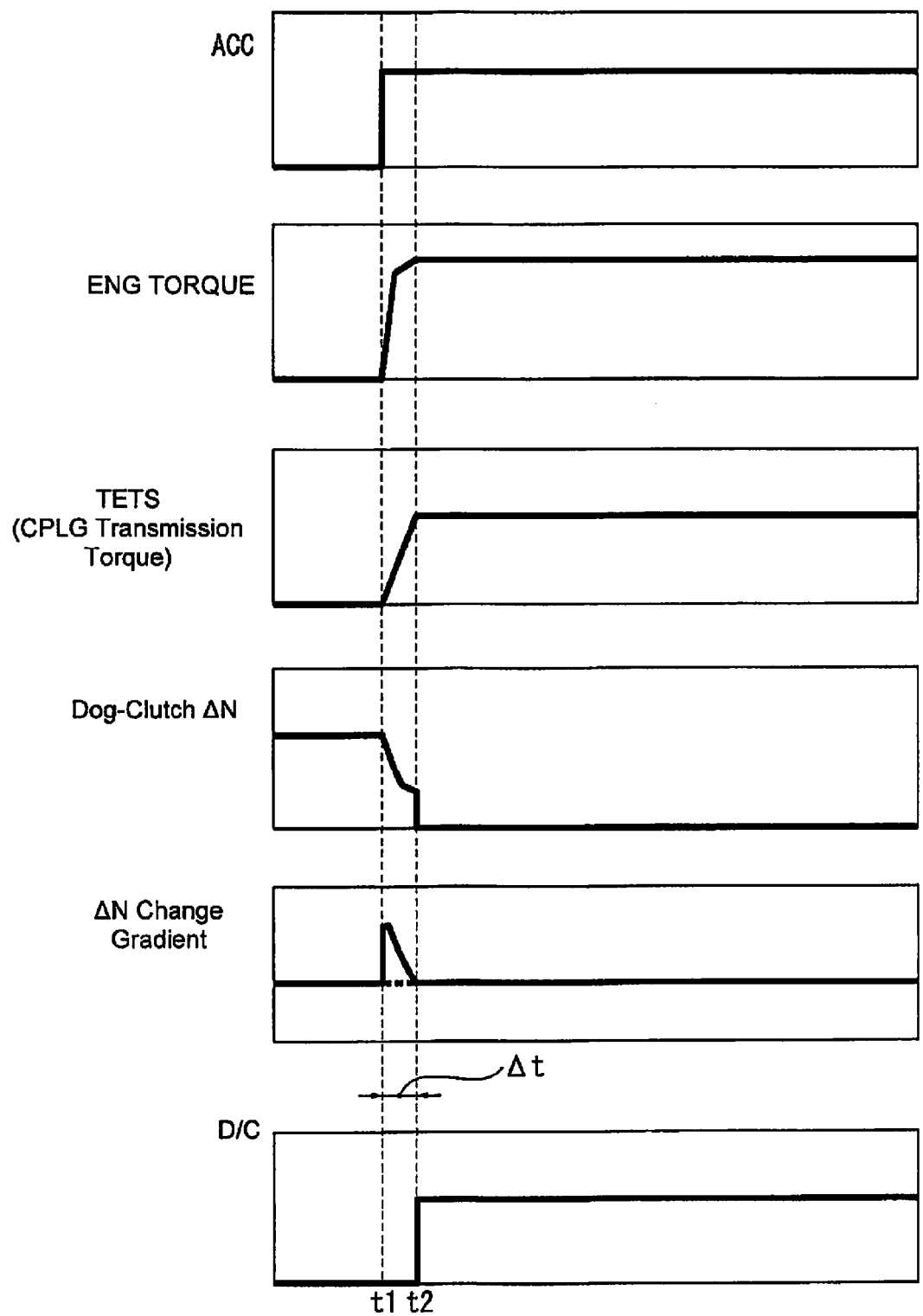
FIG. 6 is a time chart illustrating each of the features: accelerator position opening amount (ACC)/engine torque coupling transmission torque (TETS)/clutch differential rotation speed ΔN/AN change gradient/dog clutch engagement/disengagement states, when there is a request to engage the dog clutch.

Next, the engagement control action of the dog clutch 8 when the change gradient zero condition is satisfied will be described, based on the time chart of FIG. 6.

When the accelerator position opening amount ACC rises at time t1, the engine torque and the coupling transmission torque start to rise from a timing that is slightly delayed from time t1. Then, the clutch differential rotation speed ΔN starts to fall with the engagement of the electronically controlled coupling 16, and the ΔN change gradient shifts to a decreasing gradient.

From time t1 to time t2, the engine torque rises to a torque corresponding to the accelerator position opening amount ACC, and the coupling transmission torque rises to a torque by a full engagement. Then, the clutch differential rotation speed ΔN decreases in accordance with an increase in the engagement capacity of the electronically controlled coupling 16, and the ΔN change gradient shifts from a decreasing gradient to a zero gradient. With this shift of the ΔN change gradient from a decreasing gradient to a zero gradient, the disengaged dog clutch 8 will be engaged at time t2, when the change gradient zero condition is satisfied.

In this manner, when an accelerator depression operation is performed while the "disconnected, two-wheel drive mode" is selected, the dog clutch 8 is engaged at a short time Δt from time t1 to time t2, when the change gradient zero condition is satisfied. As a result, a drive mode transition from the "disconnected, two-wheel drive mode" to the "connected, four-wheel drive mode," or the drive mode transition from the "disconnected, two-wheel drive mode" to the "standby two-wheel drive mode" is achieved with good responsiveness.

Synchronization Determination Action of the Dog Clutch

Unlike a friction clutch that can be engaged regardless of the presence/absence of a clutch differential rotation, the dog clutch 8 is a dog clutch that is engaged by putting the input and output rotations of the clutch into a synchronized state. Accordingly, when the "disconnected, two-wheel drive mode," in which the dog clutch 8 is released, is selected, and there is a request to engage the dog clutch 8, it is first necessary to determine whether or not the input and output rotations of the dog clutch 8 are in a synchronous rotation state and to start the engagement of the clutch.

In a conventionally performed determination of whether or not the input and output rotations of the dog clutch are in a synchronous rotation state, the determination is made when the clutch differential rotation is eliminated (clutch differential rotation speed=0), as suggested in Japanese Laid Open Patent Application No. 2010-254058. Consequently, there are the following problems.

(a) When the main drive wheels are in a slip state, the amount that the differential rotation can be reduced is limited depending on the vehicle state, leading to cases in which the dog clutch cannot be engaged. That is, on a road surface on which the left and right front wheels slip, since the tires will slip further even if the propeller shaft is synchronously rotated and the clutch differential rotation speed of the dog clutch is reduced, the decrease of the clutch differential rotation speed hits a lower limit at a certain value (refer to FIG. 8).

(b) When the main drive wheels are in a slip state and the dog clutch is attempted to be forcibly engaged in a state in which there is a clutch differential rotation, it is difficult to determine an appropriate differential rotation that allows satisfactory sound vibration performance. That is, even if the clutch differential rotation speed is monitored, a determination cannot be made until a timing after the point at which the clutch differential rotation speed is at a minimum (refer to FIG. 8).

In contrast, the first embodiment is configured so that when there is a request to engage the dog clutch 8 from a disengaged state, an engagement control of the electronically controlled coupling 16 is carried out first. Then, during the engagement control of the electronically controlled coupling 16, the change gradient ΔN/dt of the clutch differential rotation speed ΔN of the dog clutch 8 is monitored, and an engagement of the dog clutch 8 is started when it is determined that the gradient of the clutch differential rotation speed ΔN is no longer decreasing.

Figure 7:
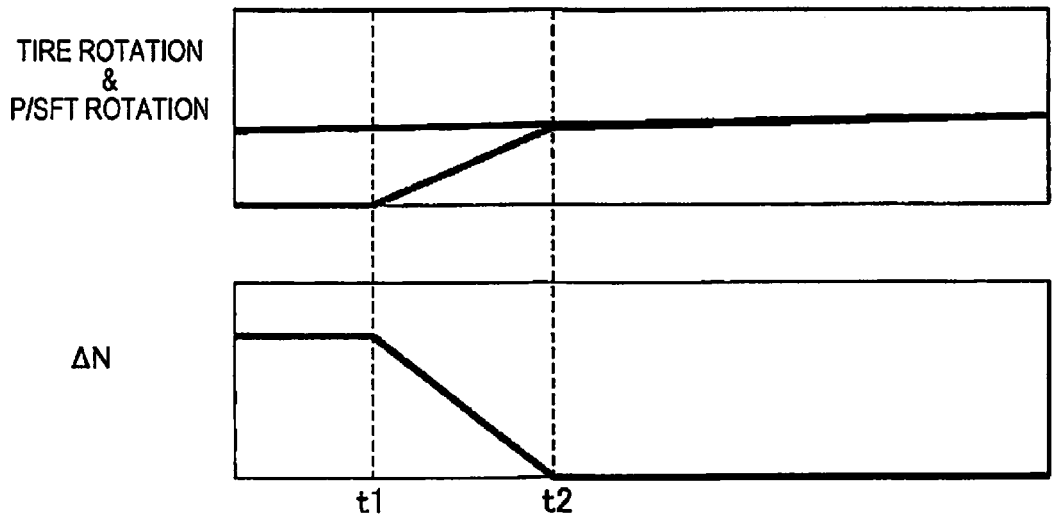
FIG. 7 is a time chart illustrating each of the features: tire rotation/propeller shaft rotation/clutch differential rotation speed ΔN, when there is a request to engage the dog clutch, in the case that the front tires are not slipping (at the time of non-slip driving).
Figure 8:
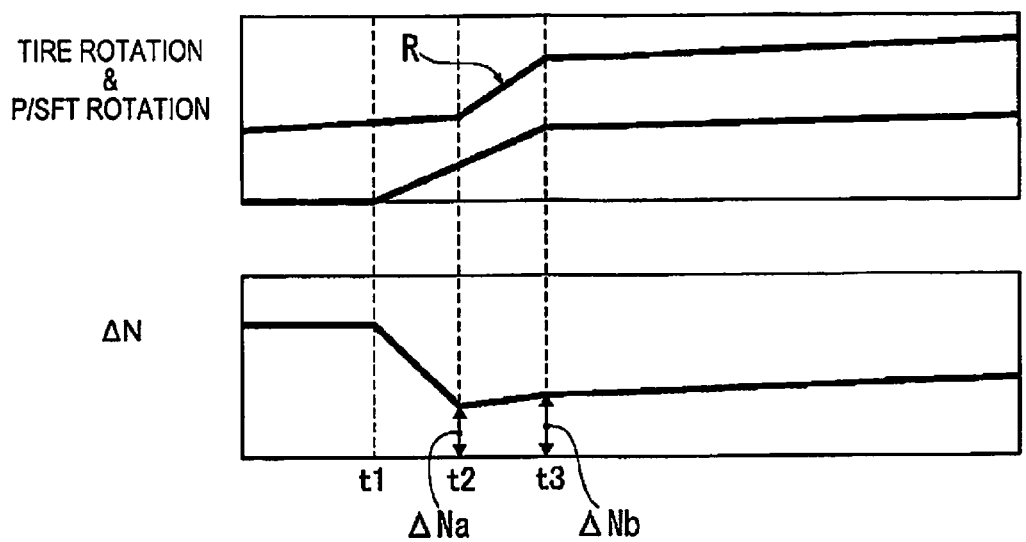
FIG. 8 is a time chart illustrating each of the features: tire rotation/propeller shaft rotation/clutch differential rotation speed ΔN, when there is a request to engage the dog clutch, in the case that the front tires are slipping (at the time of wheel slip).

That is, when the engagement of the electronically controlled coupling 16 is controlled, the stopped propeller shaft 12 is rotated and the output side rotational frequency of the dog clutch 8 is increased. Therefore, the clutch differential rotation speed ΔN of the dog clutch 8 is reduced with the passage of time. At this time, if the left and right front wheels 6 and 7 are in a non-slip state and the front wheel tires do not slip, the clutch differential rotation speed ΔN (i.e., tire rotation speed−propeller shaft rotation speed) will decrease to zero between time t1 and time t2, as illustrated in FIG. 7. However, if the left and right front wheels 6 and 7 are in a slip state and the front wheel tires slip, the clutch differential rotation speed ΔN, which has been decreasing with the passage of time from time t1, will reach a limit at time t2 when reaching a certain clutch differential rotation speed ΔNa, as illustrated in FIG. 8. Then, after time t2, with a rise in the tire rotation (clutch input rotation) due to slip, the clutch differential rotation speed ΔN shifts to an increase, and the clutch differential rotation speed ΔN increases with time, and reaches a clutch differential rotation speed ΔNb (>ΔNa) at time t3, as illustrated by the arrow R in FIG. 8. On the other hand, when the dog clutch 8 is engaged, the sound vibration performance is improved as the clutch differential rotation speed ΔN decreases (the lower the clutch differential rotation speed ΔN).

In contrast, with a focus on the change gradient ΔN/dt of the clutch differential rotation speed ΔN, the engagement of the dog clutch 8 is started when it is determined that the gradient is no longer decreasing. Accordingly, an appropriate engagement timing that allows satisfactory sound vibration performance is determined, such as, when the clutch differential rotation speed ΔN is zero when the left and right front wheels 6 and 7 are in a non-slip state, and when the clutch differential rotation speed ΔN is minimal when the left and right front wheels 6 and 7 are in a slip state. That is, when the left and right front wheels 6 and 7 are in a non-slip state, it is determined that a synchronous rotation state has been entered at time t2 in FIG. 7, when the clutch differential rotation speed ΔN becomes ΔN=0. In addition, when the left and right front wheels 6 and 7 are in a slip state, it is determined that a synchronous rotation state has been entered at time t2 (ΔN=ΔNb) in FIG. 8, when the clutch differential rotation speed ΔN reaches a minimum. As a result, when an engagement of the dog clutch 8 is requested, the dog clutch 8 can be engaged while allowing satisfactory sound vibration performance, regardless of whether the left and right front wheels 6 and 7 are in a non-slip state or a slip state.

Other Featured Actions of the Dog Clutch Engagement Control

The first embodiment is configured to determine that the gradient of the clutch differential rotation speed $\Delta N$ is no longer decreasing, with a shift in the change gradient $\Delta N/dt$ of the clutch differential rotation speed $\Delta N$ from decreasing to zero, or, a shift in the change gradient $\Delta N/dt$ of the clutch differential rotation speed $\Delta N$ from decreasing to increasing. With this configuration, when the left and right front wheels 6 and 7 are in a non-slip state, it is determined that a synchronous rotation state has been entered with the change gradient $\Delta N/dt$ of the clutch differential rotation speed $\Delta N$ shifting from decreasing to zero. In addition, when the left and right front wheels 6 and 7 are in a slip state, it is determined that a synchronous rotation state has been entered with the change gradient $\Delta N/dt$ of the clutch differential rotation speed $\Delta N$ shifting from decreasing to increasing. Therefore, when an engagement of the dog clutch 8 is requested, a synchronous rotation state for engaging the dog clutch 8 at an appropriate timing can be determined, regardless of whether the left and right front wheels 6 and 7 are in a non-slip state or a slip state.

The first embodiment comprises a "disconnected, two-wheel drive mode," a "standby two-wheel drive mode," and a "connected, four-wheel drive mode," as drive modes of the four-wheel drive vehicle, and a switching control of the drive mode is carried out according to the vehicle state. The embodiment is configured so that a request to engage the dog clutch 8 is output when there is a switching transition from the "disconnected, two-wheel drive mode" to the "standby two-wheel drive mode", or, a switching transition from the "disconnected, two-wheel drive mode" to the "connected, four-wheel drive mode." When there is a request to engage the dog clutch 8, the engagement control (or the result) is different when switching from the "disconnected, two-wheel drive mode" to the "standby two-wheel drive mode" compared to when switching to the "connected, four-wheel drive mode." That is, the switch to the "connected, four-wheel drive mode" is a switching of the drive mode for switching from a two-wheel drive mode to a four-wheel drive mode. On the other hand, since a switch to the "standby two-wheel drive mode" is a switching of the drive mode that maintains the two-wheel drive state such as from a two-wheel drive state to a two-wheel drive state, there is a demand to carry out the switch without creating discomfort for the driver insofar as possible. In contrast, when switching from the "disconnected, two-wheel drive mode" to the "standby two-wheel drive mode," the engagement of the dog clutch 8 is started at a timing at which the clutch differential rotation speed $\Delta N$ reaches the minimum (including zero). Therefore, it is possible to satisfy the demand to carry out a switch without creating discomfort for the driver insofar as possible, when switching from the "disconnected, two-wheel drive mode" to the "standby two-wheel drive mode" via an engagement of the dog clutch (dog clutch 8).

In the first embodiment, the dog clutch 8 is disposed in an upstream position of the output pinion 10 and the bevel gear 9 provided at a drive branch position to the left and right front wheels 6 and 7. The electronically controlled coupling 16 is configured to be disposed in the left rear wheel drive shaft 17 position of the left rear wheel 19, which extends from the bevel gear 9 and the output pinion 10 through the rear wheel output shaft 11, the propeller shaft 12 and the drive pinion 13, the ring gear 14, and the rear differential 15. With this configuration, when the "disconnected, two-wheel drive mode" is selected, the rotation of the differential case of the bevel gear 9, the output pinion 10, the rear wheel output shaft 11, the propeller shaft 12, the drive pinion 13, the ring gear 14, and the rear differential 15, is stopped. Therefore, when the "disconnected, two-wheel drive mode" is selected, an action is displayed to stop the rotation of the drive system from the dog clutch 8 to the electronically controlled coupling 16, and it is possible to effectively suppress friction loss and oil stirring loss, to achieve an improvement in fuel efficiency.

Next, the effects are described. The effects listed below can be obtained with the clutch control device for a four-wheel drive vehicle according to the first embodiment.

(1) In a four-wheel drive vehicle, in which, of the left and right front wheels 6 and 7 and the left and right rear wheels 19 and 20, one pair is set as the main drive wheels which are connected to a drive source (transverse engine 1) and the other pair is set as the auxiliary drive wheels which are connected to the drive source (transverse engine 1) via a clutch, and which comprises plural clutches, that is, a dog clutch (dog clutch 8) and a friction clutch (electronically controlled coupling 16), which are respectively disposed separately in a drive branch-side transmission system path and in an auxiliary drive wheel-side transmission system path that sandwich a differential (rear differential 15), in a system for transmitting drive force to the auxiliary drive wheels (the left and right rear wheels 19 and 20), where the dog clutch (dog clutch 8) separates the system for transmitting drive force to the auxiliary drive wheels (left and right rear wheels 19 and 20) from the system for transmitting drive force to the main drive wheels (left and right front wheels 6 and 7) by release of the clutch, and the friction clutch (electronically controlled coupling 16) allocates a portion of the drive force from the drive source (transverse engine 1) to the auxiliary drive wheels (left and right rear wheels 19 and 20) in accordance with the clutch engagement capacity, and a clutch controller (4WD control unit 34, FIG. 5) that carries out an engagement and disengagement control of the dog clutch (dog clutch 8) and an engagement and disengagement control of the friction clutch (electronically controlled coupling 16), wherein when there is a request to engage the dog clutch (dog clutch 8) from a disengaged state, the clutch controller (4WD control unit 34, FIG. 5) first controls the engagement of the friction clutch (electronically controlled coupling 16), monitors the change gradient $\Delta N/dt$ of the clutch differential rotation speed $\Delta N$ of the dog clutch (dog clutch 8) while controlling the engagement of the friction clutch (electronically controlled coupling 16), and starts the engagement of the dog clutch (dog clutch 8) when it is determined that the gradient of the clutch differential rotation speed $\Delta N$ is no longer decreasing (FIG. 5). Accordingly, when there is a request to engage the dog clutch (dog clutch 8), the dog clutch (dog clutch 8) can be engaged while allowing satisfactory sound vibration performance, regardless of whether the main drive wheels (left and right front wheels 6 and 7) are in a non-slip state or a slip state.

(2) The clutch controller (4WD control unit 34, FIG. 5) comprises a decreasing gradient determination section (S5, S6 in FIG. 5) which determines whether the gradient of the clutch differential rotation speed $\Delta N$ is no longer decreasing, with a shift of the change gradient $\Delta N/dt$ of the clutch differential rotation speed $\Delta N$ from decreasing to zero, or, a shift of the change gradient $\Delta N/dt$ of the clutch differential rotation speed ΔN from decreasing to increasing (FIG. 7, FIG. 8). Accordingly, in addition to the effect of (1), when an engagement of the dog clutch (dog clutch 8) is requested, a synchronous rotation state for engaging the dog clutch (dog clutch 8) at an appropriate timing can be determined, regardless of whether the main drive wheels (left and right front wheels 6 and 7) are in a non-slip state or a slip state.

(3) The embodiment comprises a "disconnected, two-wheel drive mode" in which the dog clutch (dog clutch 8) and the friction clutch (electronically controlled coupling 16) are disengaged, a "standby two-wheel drive mode" in which the dog clutch (dog clutch 8) is engaged and the friction clutch (electronically controlled coupling 16) is disengaged, and a "connected, four-wheel drive mode" in which the dog clutch (dog clutch 8) and the friction clutch (electronically controlled coupling 16) are engaged, as drive modes of a four-wheel drive vehicle, and is provided with a drive mode switching controller (4WD control unit 34) that carries out a switching control of the drive mode in accordance with the vehicle state (vehicle speed VSP, accelerator position opening amount ACC), wherein the drive mode switching controller (4WD control unit 34) outputs a request to engage the dog clutch (dog clutch 8) to the clutch controller (4WD control unit 34, FIG. 5) upon a switching transition from the "disconnected, two-wheel drive mode" to the "standby two-wheel drive mode" or, a switching transition from the "disconnected, two-wheel drive mode" to the "connected, four-wheel drive mode" (FIG. 3, FIG. 4). Accordingly, in addition to the effect of (1) or (2), it is possible to satisfy the demand to carry out a switch without creating discomfort for the driver insofar as possible, when switching from the "disconnected, two-wheel drive mode" to the "standby two-wheel drive mode" via an engagement of the dog clutch (dog clutch 8).

(4) The dog clutch (dog clutch 8) is disposed in an upstream position of a transfer mechanism (bevel gear 9, output pinion 10) provided at a drive branch position to the auxiliary drive wheels (left and right rear wheels 19 and 20), and the friction clutch (electronically controlled coupling 16) is disposed in the drive shaft (left rear wheel drive shaft 17) position of the auxiliary drive wheel (left rear wheel 19), which extends from the transfer mechanism (bevel gear 9, output pinion 10) to the propeller shaft 12 and the differential (rear differential 15) (FIG. 1). Accordingly, in addition to the effects of (1)-(3), in a front wheel drive based four-wheel drive vehicle, when the "disconnected, two-wheel drive mode" is selected, it is possible to effectively suppress friction loss and oil stirring loss, to achieve an improvement in fuel efficiency.

Second Embodiment

A second embodiment is an example in which the clutch control device is applied to a rear wheel drive based four-wheel drive vehicle, and the positional relationship of the dog clutch and the friction clutch which sandwich the differential is reversed from the positional relationship thereof in the first embodiment.

Figure 9:
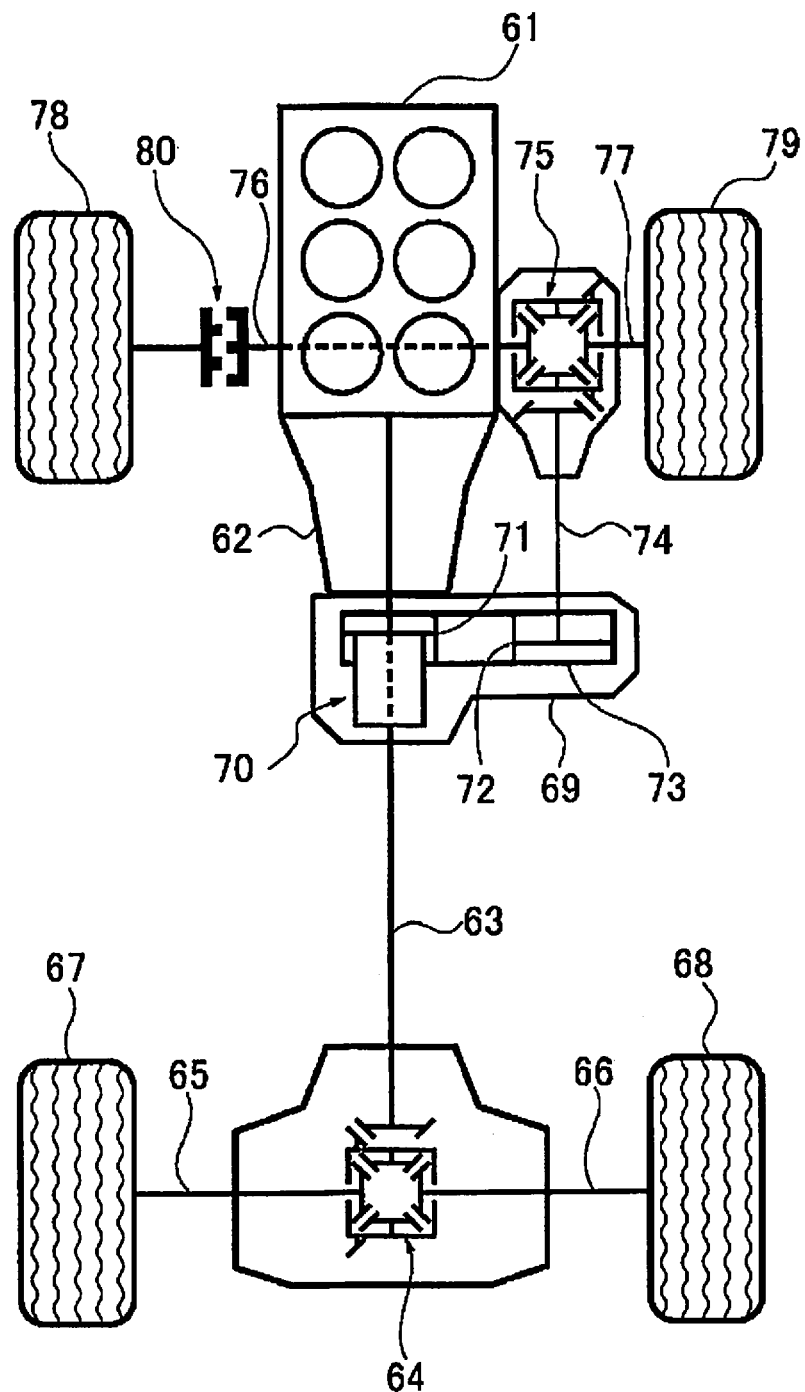
FIG. 9 is a block view of the drive system illustrating the configuration of the drive system of a rear wheel drive based four-wheel drive vehicle to which is applied the clutch control device of the second embodiment.

FIG. 9 illustrates the configuration of the drive system of a rear wheel drive based four-wheel drive vehicle to which is applied the clutch control device. The drive system configuration of the four-wheel drive vehicle will be described below based on FIG. 9.

The rear wheel drive system of the four-wheel drive vehicle is provided with a transverse engine 61 (drive source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel), as illustrated in FIG. 9. That is, the drive force that is transmitted from the transverse engine 61 and the transmission 62 to the left and right rear wheel drive shafts 65, 66 via the rear propeller shaft 63 and the rear differential 64, and constantly drives the left and right rear wheels 67 and 68 while allowing a differential rotation.

In the front wheel drive system of the four-wheel drive vehicle, a transfer mechanism is configured to comprise, inside a transfer case 69, an electronically controlled coupling 70 (friction clutch), an input side sprocket 71, an output side sprocket 72, and a chain 73, as illustrated in FIG. 9. A front propeller shaft 74 that is connected to the output side sprocket 72, a front differential 75, a left front wheel drive shaft 76, a right front wheel drive shaft 77, a left front wheel 78 (auxiliary drive wheel), and a right front wheel 79 (auxiliary drive wheel) are provided. The electronically controlled coupling 70 is disposed inside the transfer case 69 in an upstream position of the input side sprocket 71 (main drive system side position).

A dog clutch 80 (dog clutch) is disposed in an intermediate position of the left front wheel drive shaft 76, which connects the front differential 75 and the left front wheel 78. That is, the drive system is configured to be capable of selecting a two-wheel drive mode (i.e., disconnected, two-wheel drive mode) in which both the electronically controlled coupling 70 and the dog clutch 80 are disengaged. The rotation of the drive system (rotation of the front propeller shaft 74, etc.) on the downstream side of the electronically controlled coupling 70, is stopped by releasing these electronically controlled coupling 70 and dog clutch 80. It is thereby possible to suppress friction loss and oil stirring loss to achieve improved fuel efficiency.

Next, the synchronous operation of the dog clutch 80 will be described. The first embodiment is configured so that the dog clutch 8 is disposed in the drive branch-side transmission system path and the electronically controlled coupling 16 is disposed in the auxiliary drive wheel-side transmission system path, which sandwich the rear differential 15, of the system for transmitting drive force to the left and right rear wheels 19 and 20, which are the auxiliary drive wheels. Accordingly, when there is a request to engage the dog clutch 8 from a disengaged state, and an engagement control of the electronically controlled coupling 16 is carried out, the left side gear of the rear differential 15 is restricted by the rotational frequency of the left rear wheel 19. Therefore, of the three rotating members of the rear differential 15 (left and right side gears and the differential case), by the rotational frequency of the left and right side gears being restricted, the rotational frequency of the propeller shaft 12, which is connected to the differential case becomes the average rotational frequency of the left and right rear wheels 19 and 20 (driven wheel rotational frequency). As a result, when the left and right front wheels 6 and 7 are in a non-slip state, the clutch differential rotation speed ΔN of the dog clutch 8 becomes ΔN=0 (refer to FIG. 7). However, when the left and right front wheels 6 and 7 are in a slip state, the clutch differential rotation speed ΔN which has been decreasing with the passage of time will reach a limit at a certain differential rotation; thereafter, the clutch differential rotation speed ΔN shifts to an increase, and the clutch differential rotation speed ΔN increases with time (refer to FIG. 8).

In contrast, the second embodiment is configured so that the electronically controlled coupling 70 is disposed in the drive branch-side transmission system path and the dog clutch 80 is disposed in the auxiliary drive wheel-side transmission system path, which sandwich the front differential 75, of the system for transmitting drive force to the left and right front wheels 78, 79, which are the auxiliary drive wheels. Accordingly, when there is a request to engage the dog clutch 80, which is in a disengaged state, and an engagement control of the electronically controlled coupling 70 is carried out, the differential case of the front differential 75 is restricted by the rotational frequency of the rear propeller shaft 63. Therefore, of the three rotating members of the front differential 75 (left and right side gears and the differential case), by the rotational frequency of the right side gear (right front wheel 79) and the differential case being restricted, the rotational frequency of the left side gear will be determined by two rotational frequencies. As a result, when the left and right rear wheels 67 and 68 are in a non-slip state, the clutch differential rotation speed $\Delta N$ of the dog clutch 80 becomes $\Delta N=0$. However, when the left and right rear wheels 67 and 68 are in a slip state, the clutch differential rotation speed $\Delta N$ which has been decreasing with time will change sign at $\Delta N=0$ (zero). Thereafter, the clutch differential rotation speed $\Delta N$ will be increased with changed sign. The other actions are the same as the first embodiment, so that the descriptions thereof are omitted.

Next, the effects are described. The following effects can be obtained with the clutch control device for a four-wheel drive vehicle according to the second embodiment.

(5) The friction clutch (electronically controlled coupling 70) is disposed in an upstream position of a transfer mechanism (input side sprocket 71, output side sprocket 72, chain 73) provided at a drive branch position to the auxiliary drive wheels (left and right front wheels 78, 79), and the dog clutch (dog clutch 80) is disposed in the drive shaft (left front wheel drive shaft 76) position of the auxiliary drive wheel (left front wheel 78), which extends from the transfer mechanism to the propeller shaft (front propeller shaft) and the differential (front differential 75). Accordingly, in addition to the effects of (1)-(3) described above, in a rear wheel drive based four-wheel drive vehicle, when the "disconnected, two-wheel drive mode" is selected, it is possible to effectively suppress friction loss and oil stirring loss, to achieve an improvement in fuel efficiency.

The clutch control device for a four-wheel drive vehicle of the present invention was described above based on the first embodiment and the second embodiment, but specific configurations thereof are not limited to these embodiments, and various modifications and additions to the design can be made without departing from the scope of the invention according to each claim in the Claims section.

In the first embodiment, an example was shown in which a "disconnected, two-wheel drive mode," a "standby two-wheel drive mode," and a "connected, four-wheel drive mode" are provided as drive modes of a four-wheel drive vehicle. However, the drive modes of a four-wheel drive vehicle may comprise only the "disconnected, two-wheel drive mode" and the "connected, four-wheel drive mode" without the "standby two-wheel drive mode."

In the first embodiment, an example was shown in which a dog clutch 8 is disposed in an upstream position of the transfer mechanism as a dog clutch. However, a dog clutch may be disposed in a downstream position of the transfer mechanism, in the propeller shaft position, as the dog clutch.

In the first embodiment, an example was shown in which an electronically controlled coupling 16 is disposed in an intermediate position of the left rear wheel drive shaft 17 as the friction clutch. However, an electronically controlled coupling may be disposed in an intermediate position of the right rear wheel drive shaft as the friction clutch.

In the first embodiment, an example was shown in which the clutch control device of the present invention is applied to a front wheel drive based four-wheel drive vehicle (4WD engine vehicle), to which an engine is mounted as the drive source. In the second embodiment, an example was shown in which the clutch control device of the present invention is applied to a rear wheel drive based four-wheel drive vehicle (4WD engine vehicle), in which the left and right rear wheels are the main drive wheels. However, the clutch control device may be applied to a rear wheel drive based four-wheel drive vehicle in which the positional relationship of the dog clutch and the friction clutch is set as the relationship thereof in the first embodiment. In addition, the clutch control device may be applied to a front wheel drive based four-wheel drive vehicle in which the positional relationship of the dog clutch and the friction clutch is set as the relationship thereof in the second embodiment. Additionally, the clutch control device can, of course, be applied to other types of vehicles besides a 4WD engine vehicle, such as a 4WD hybrid vehicle, in which an engine and an electric motor are mounted as drive sources, or a 4WD electric vehicle in which an electric motor is mounted as the drive source.

The invention claimed is:

1. A clutch control device for a four-wheel drive vehicle having a pair of main drive wheels and a pair of auxiliary drive wheels which are selectively connected to a drive source, the clutch control device comprising:
    a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch, the dog clutch being engageable whether or not the main drive wheels are in a slip state;
    a friction clutch operatively disposed in a transmission path between the main drive wheels and the auxiliary drive wheels to allocate a portion of the drive force from the drive source to the auxiliary drive wheels in accordance with a clutch engagement capacity of the friction clutch; and
    a clutch controller operatively coupled to the dog clutch and the friction clutch to selectively carry out an engagement and disengagement control of the dog clutch and an engagement and disengagement control of the friction clutch,
    the clutch controller, in response to a request to engage the dog clutch, being programmed to first control an engagement of the friction clutch, monitor a change gradient of a clutch differential rotation speed of the dog clutch while controlling the engagement of the friction clutch, and start an engagement of the dog clutch upon determining that the gradient of the clutch differential rotation speed is no longer decreasing.

2. The clutch control device as recited in claim 1, wherein the clutch controller comprises a decreasing gradient determination section which is programmed to determine that the gradient of the clutch differential rotation speed is no longer decreasing upon detecting the change gradient of the clutch differential rotation speed either to zero, or increasing.

3. The clutch control device as recited in claim 1, wherein the clutch controller comprises a drive mode switching control section programmed to selectively carry out a switching control in accordance with a vehicle state to selectively establish a disconnected, two-wheel drive mode in which the dog clutch and the friction clutch are disengaged, a standby two-wheel drive mode in which the dog clutch is engaged and the friction clutch is disengaged, and a connected, four-wheel drive mode in which the dog clutch and the friction clutch are engaged, as drive modes of the four-wheel drive vehicle, and the drive mode switching control section being programmed to engage the dog clutch upon a switching transition from the disconnected, two-wheel drive mode to the standby two-wheel drive mode, or, a switching transition from the disconnected, two-wheel drive mode to the connected, four-wheel drive mode.

4. The clutch control device as recited in claim 1, wherein the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

5. The clutch control device as recited in claim 1, wherein the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

6. The clutch control device according to claim 2, wherein the clutch controller comprises a drive mode switching control section programmed to selectively carry out a switching control in accordance with a vehicle state to selectively establish a disconnected, two-wheel drive mode in which the dog clutch and the friction clutch are disengaged, a standby two-wheel drive mode in which the dog clutch is engaged and the friction clutch is disengaged, and a connected, four-wheel drive mode in which the dog clutch and the friction clutch are engaged, as drive modes of the four-wheel drive vehicle, and
the drive mode switching control section being programmed engage the dog clutch upon a switching transition from the disconnected, two-wheel drive mode to the standby two-wheel drive mode, or, a switching transition from the disconnected, two-wheel drive mode to the connected, four-wheel drive mode.

7. The clutch control device according to claim 2, wherein the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

8. The clutch control device according to claim 3, wherein the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

9. The clutch control device according to claim 2, wherein the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

10. The clutch control device according to claim 3, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

11. A clutch control device for a four-wheel drive vehicle having a pair of main drive wheels and a pair of auxiliary drive wheels which are selectively connected to a drive source, the clutch control device comprising:
a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch;
a friction clutch operatively disposed in a transmission path between the main drive wheels and the auxiliary drive wheels to allocate a portion of the drive force from the drive source to the auxiliary drive wheels in accordance with a clutch engagement capacity of the friction clutch; and
a clutch controller operatively coupled to the dog clutch and the friction clutch to selectively carry out an engagement and disengagement control of the dog clutch and an engagement and disengagement control of the friction clutch,
the clutch controller, in response to a request to engage the dog clutch, being programmed to first control an engagement of the friction clutch, monitor a change gradient of a clutch differential rotation speed of the dog clutch while controlling the engagement of the friction clutch, and start an engagement of the dog clutch upon determining that the gradient of the clutch differential rotation speed is no longer decreasing, the clutch controller monitoring a change gradient of the clutch differential rotation speed of the dog clutch by calculating a difference between an output rotational speed and an input rotational speed of the dog clutch.

12. The clutch control device according to claim 11, wherein
the difference between the output rotational speed and the input rotational speed of the dog clutch is calculated by subtracting the output rotational speed from the input rotational speed.

* * * * *